United States Patent [19]

Scheibitz et al.

[11] 3,888,971

[45] June 10, 1975

[54] PROCESS FOR THE MANUFACTURE OF HYPOPHOSPHITES

[75] Inventors: Wolfgang Scheibitz, Hurth-Knapsack; Horst Staendeke, Bruhl; Siegfried Burkhardt, Bruhl-Kierberg, all of Germany

[73] Assignee: Hoechst Aktiengesellschaft, Knapsack near Cologne, Germany

[22] Filed: May 22, 1972

[21] Appl. No.: 255,442

[30] Foreign Application Priority Data
May 24, 1971 Germany............................ 2125587

[52] U.S. Cl. ................................................ 423/307
[51] Int. Cl. ...................... C01b 15/16; C01b 25/26
[58] Field of Search ..................................... 423/307

[56] References Cited
UNITED STATES PATENTS

| | | | |
|---|---|---|---|
| 2,938,770 | 5/1960 | Pahud................................. | 423/307 |
| 2,976,117 | 3/1961 | Pahud................................. | 423/307 |
| 2,976,118 | 3/1961 | Pahud................................. | 423/307 |
| 2,977,192 | 3/1961 | Cummins............................ | 423/307 |
| 3,378,342 | 4/1968 | Mesmer et al...................... | 423/307 |

*Primary Examiner*—Oscar R. Vertiz
*Assistant Examiner*—Gregory A. Heller
*Attorney, Agent, or Firm*—Connolly & Hutz

[57] ABSTRACT

Hypophosphites are made by the reaction of yellow phosphorus with hydroxides and/or carbonates of alkali metals and/or alkaline earth metals in the presence of water and organic solvents. To this end, the reaction is carried out with the use of solvents, which combine the property of dissolving phosphorus with immiscibility or substantial immiscibility with water and are liquid at the reaction temperature and, following completion of the reaction, the resulting aqueous phase having the hypophosphites therein is separated from the resulting nonaqueous phase, and the hypophosphites are isolated from the aqueous phase in conventional manner.

6 Claims, No Drawings

PROCESS FOR THE MANUFACTURE OF HYPOPHOSPHITES

The present invention relates to a process for the manufacture of hypophosphites and by the reaction of yellow phosphorus with hydroxides and/or carbonates of alkali metals or alkaline earth metals in the presence of water and organic solvents.

It has already been described that phosphorus can be reacted with various metal hydroxides to produce hydrogen phosphide and metal hypophosphite/phosphite mixtures, for example in accordance with the following considerably simplified reaction equations:

1. $P_4 + 3\ OH^- + 3\ H_2O \rightarrow PH_3 + 3\ H_2PO_2^-$
2. $P_4 + 4\ OH^- + 2\ H_2O \rightarrow 2\ PH_3 + 2\ HPO_3^{2-}$ The processes described heretofore comprise suspending yellow phosphorus in an aqueous or homogeneous aqueous-alcoholic phase, reacting the resulting suspension with hydroxides or carbonates, particularly of alkali metals and alkaline earth metals, and isolating phosphite, which is always obtained together with the hypophosphite, from the hypophosphite, by various separating methods. While alcohols of low molecular weight are added in an attempt to accelerate the reaction velocity, the fact remains that the alcohols render the work-up of the final products more difficult.

The very long reaction times — if use is made of an aqueous phase, for example — or the costly recovery of the solvent — if use is made of an aqueous-alcoholic phase, where the reaction times are slightly shorter — are disadvantageous phenomena which are encountered in these processes.

It should be added that these earlier processes often produce crude solutions having residual phosphorus or phosphorus subcompounds therein, which must be isolated therefrom and destroyed. A further considerable disadvantage of these earlier processes resides in the use of very dilute starting material which at best enables the formation of solutions containing as little as between about 10 and 20 weight percent of sodium hypophosphite monohydrate, for example. This is highly undesirable in view of the considerable solubility of alkali metal hypophosphites and as large quantities of water have to be evaporated for the recovery of crystalline salts. Despite the disadvantages mentioned above, it is possible to produce hypophosphites in aqueous media within acceptable limits, but this dictates the use of very disperse phosphorus and the use of special high-speed agitators and suspension means.

In the process used heretofore, the reaction obviously appears to take place at the surface of the phosphorus so dispersed and this mere fact already sets limits to the reaction velocity and concentration.

The present invention now unexpectedly provides a process which enables the disadvantages phenomena described above to be set aside, if use is made of a solution of phosphorus in a hydrophobic organic solvent to replace the disperse phosphorus which has been used heretofore as starting material in conventional processes. Merely slow agitation of the organic phase together with the aqueous-alkaline phase is necessary to produce relatively stable emulsions as the difference between the density of the two liquid phases is considerably smaller than that between the phosphorus and the aqueous solution. These mild conditions already permit the reaction velocity and selectivity as well as the concentration ratios in the resulting final products, which are obtained in the form of an aqueous solution, to be greatly influenced as the reaction surfaces or contact surfaces of the phases are a multiple of the surfaces in conventional processes. In addition to this, the phosphorus is very likely to dissolve as a $P_4$-molecule and thereby given a reactive form.

The process of the present invention for the manufacture of hypophosphites by the reaction of yellow phosphorus with hydroxides and/or carbonates of alkali metals and/or alkaline earth metals in the presence of water and organic solvents comprises more particularly carrying out the reaction with the use of organic solvents, which combine the property of dissolving phosphorus with immiscibility or substantial immiscibility with water and are liquid at the reaction temperature and, following completion of the reaction, separating from the resulting non-aqueous phase the resulting aqueous phase having the hypophosphites therein, and isolating the hypophosphites therefrom in conventional manner.

The organic solvents suitable for use in the process of the present invention includes more particularly hydrocarbons, halogenated hydrocarbons, alcohols containing more than 5 carbon atoms and amines containing more than 10 carbon atoms, such as paraffin, tetrachlorethylene, tributylamine or hexyl alcohol. The organic solvents should preferably be used in a proportion between 3 and 20 weight percent, more preferably 10 weight percent, based on the quantity of solvent that would be needed to dissolve the whole quantity of phosphorus.

The reaction should be effected at temperatures between 40° and 90°C and is normally terminated after substantially 20 to 50 minutes.

The isolated non-aqueous phase may well be used for further reactions.

The following are the most beneficial effects of the process of the present invention:

1. The reaction time of formerly 2 to 7 hours is reduced down to substantially 20 to 50 minutes.

2. The concentration of sodium hypophosphite, for example, in the solution of the final product can be increased up to 25–40 percent, compared with the former maximum concentration between 15 and 20 percent. As a result, substantial energy economies are effected upon the recovery of the solid salts.

3. Absence of any residue of phosphorus or phosphorus subcompounds. As a result, it is unnecessary to destroy any waste material.

4. The use of alkali metal hydroxide/alkaline earth metal hydroxide-mixtures in the process of the present invention results in the formation of hypophosphite solutions which are substantially free from phosphites. They normally contain less than 1 percent of phosphite contaminants, prior to any further purifying treatment. Merely a single step reaction is necessary to produce salts of substantially 99 weight percent strength in a yield of substantially 60 percent, based on P.

5. The reaction or redissolution of the phosphorus in the organic solvents used occurs with a velocity such that fractions of the quantity of organic solvent theoretically needed to dissolve the entire quantity of phosphorus are sufficient to produce the effect desired.

6. The loss of the quasi catalytically active solvents is as low as their solubility in the resulting concentrated salt solutions; the loss even becomes ignorable by the selection of suitable materials.

7. As compared with conventional processes, wherein water-soluble alcohols of low molecular weight are added to the reaction mixture, the process of the present invention can be carried out under more reliable and safe conditions. Organic solvents having very high flash points or drop ignition temperatures can be used; owing to the minor volatility of these substances, hydrogen phosphide, which is always found to form, is prevented from forming dangerous mixtures therewith, in the event of leakages in the apparatus, for example, and merely slow-burning, non-explosive fireoutbreaks are likely to take place if accidents ever happen to occur.

8. Organic impurities originating from the phosphorus and necessarily introduced heretofore into the solutions of the final product, commonly have a hydrophobic nature which enables them to be absorbed by the organic solvents so that they no longer appear in the final product.

The following Examples further illustrate the process of the present invention which, however, is not limited thereto:

EXAMPLE 1:

450 ml of $H_2O$, 150 ml of paraffin, 93 grams of yellow phosphorus (3.0 gram-atoms) and 48 grams of Ca-$(OH)_2$ (0.65 mol) were heated in a closed apparatus having nitrogen therein. 141.8 Grams of NaOH of 50 weight percent strength were added within 15 minutes at 50°C and the whole was heated to 90°C within 40 minutes; $PH_3$-gas which was found to issue was removed and burnt. After the reaction was complete, $CO_2$ was introduced over a period of 5 minutes to neutralize $Ca(OH)_2$ in excess. The neutral mixture was filtered, washed with 100 ml of $H_2O$ and the aqueous phase was separated from the non-aqueous phase, in a separator. The paraffin was used for making further batches. The aqueous phase (550 ml) contained 185.5 grams of $NaH_2PO_2 \cdot H_2O$ (1.748 mols). In other words, the solution had a strength of substantially 29 weight percent. The yield was 58.3 weight percent, based on the phosphorus used. The solution further contained as little as 1.703 grams of $HPO_3^{2-}$(0.0213 mol) and 0.460 grams of $Ca^{2+}$(0.0115 mol).

EXAMPLE 2:

The procedure and quantities were the same as those used in Example 1 save that 150 ml of tetrachloroethylene were substitued for the paraffin. The resulting mixture was worked up as described in Example 1. 550 ml of an aqueous salt solution, which contained 196.05 grams of $NaH_2PO_2 \cdot H_2O$ (1.849 mols), were obtained. In other words, the solution had a strength between 29 and 30 weight percent. The yield was 61.5 percent, based on the phosphorus used. The solution further contained as little as 3.34 grams of $HPO_3^{2-}$(0.0418 mol) and 2.364 grams of $Ca^{2+}$(0.059 mol).

EXAMPLE 3:

The procedure and quantities were the same as those used in Example 1, save that 250 ml of tributylamine were substituted for the paraffin. The resulting aqueous phase contained 181.8 grams of $NaH_2PO_2 \cdot H_2O$ (1.716 mols) and was obtained in a yeild of 57.15 weight percent, based on phosphorus. The solution had a strength of 30 weight percent.

EXAMPLE 4:

The same quantities of material were reacted in the manner described in Example 1 and within 30 minutes in 400 ml of $H_2O$ and 150 ml of 1-hexyl-alcohol. The resulting aqueous phase contained 190.42 grams of $NaH_2PO_2 \cdot H_2O$ (1.795 mols). The solution, which had a strength of substantially 32 weight percent, was obtained in a yield of 60 weight percent, based on phosphorus. The solution further contained as little as 1.888 grams of $HPO_3^{2-}$(0.0236 mol) and 0.428 gram of $Ca^{2+}$(0.0107 mol).

We claim:

1. A process for the manufacture of hypophosphites by the reaction of yellow phosphorus at a temperature of about 40°C – 90°C with hydroxides of alkali metals, carbonates of alkali metals, hydroxides of alkaline earth metals, carbonates of alkaline earth metals, or mixtures thereof in the presence of water and organic solvents selected from the group consisting of hydrocarbons, halogenated hydrocarbons, alcohols of more than 5 carbon atoms or amines of more than 10 carbon atoms, which combine the property of dissolving phosphorus with immiscibility or limited miscibility with water and are liquid at the reaction temperature and, following completion of the reaction, separating with a separator from the resulting non-aqueous phase of the organic solvents the resulting aqueous phase having hypophosphites therein.

2. The process as claimed in claim 1, wherein the organic solvent is paraffin, tetrachloroethylene, tributylamine or hexyl alcohol.

3. The process as claimed in claim 1, wherein the organic solvents are used in a proportion between 3 and 20 weight percent, based on the quantity of solvent needed to dissolve the whole quantity of phosphorus.

4. The process as claimed in claim 3, wherein the organic solvents are used in a proportion of substantially 10 weight percent, based on the quantity of solvent needed to dissolve the whole quantity of phosphorus.

5. The process as claimed in claim 1, wherein the reaction is effected within 20 to 50 minutes.

6. The process as claimed in claim 1, wherein the non-aqueous phase as thus separated is used as is for making further batches.

* * * * *